United States Patent
Fervel (10) Patent No.: US 11,247,768 B2
(45) Date of Patent: Feb. 15, 2022

(54) FLIGHT CONTROL SYSTEM FOR AN AIRCRAFT

(71) Applicant: Airbus Operations SAS, Toulouse (FR)

(72) Inventor: Marc Fervel, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 96 days.

(21) Appl. No.: 16/691,751

(22) Filed: Nov. 22, 2019

(65) Prior Publication Data
US 2020/0164965 A1 May 28, 2020

(30) Foreign Application Priority Data
Nov. 26, 2018 (FR) ...................................... 1871824

(51) Int. Cl.
| | | |
|---|---|---|
| *G01C 23/00* | (2006.01) | |
| *G05D 1/00* | (2006.01) | |
| *G05D 3/00* | (2006.01) | |
| *G06F 7/00* | (2006.01) | |
| *G06F 17/00* | (2019.01) | |
| *B64C 13/50* | (2006.01) | |
| *B64C 13/18* | (2006.01) | |
| *G06F 15/16* | (2006.01) | |

(52) U.S. Cl.
CPC ............ *B64C 13/505* (2018.01); *B64C 13/18* (2013.01); *G05D 1/0077* (2013.01); *G06F 15/161* (2013.01)

(58) Field of Classification Search
CPC ..... B64C 13/505; B64C 13/18; B64C 13/503; B64C 19/02; G05D 1/0077; G06F 15/161; G05B 9/03
See application file for complete search history.

(56) References Cited

U.S. PATENT DOCUMENTS

| | | | | |
|---|---|---|---|---|
| 10,656,643 | B1 * | 5/2020 | Bertram | ............... G05D 1/0077 |
| 2005/0085957 | A1 * | 4/2005 | Yeh | ...................... G05D 1/0077 |
| | | | | 701/3 |
| 2006/0100750 | A1 * | 5/2006 | Platzer | ................. G05D 1/0077 |
| | | | | 701/3 |

(Continued)

FOREIGN PATENT DOCUMENTS

| | | |
|---|---|---|
| FR | 2943036 A1 | 9/2010 |
| FR | 3047274 A1 | 8/2017 |

OTHER PUBLICATIONS

French Search Report; priority document.

*Primary Examiner* — Harry Y Oh
(74) *Attorney, Agent, or Firm* — Greer, Burns & Crain, Ltd.

(57) ABSTRACT

A flight control system for an aircraft comprises a set of actuators for controlling the aircraft and a set of flight control computers only made up of a set of duplex type main computers and of at least one backup computer. All the main computers are configured to implement auto-pilot laws for the aircraft. The set of main computers comprises two computers from a first hardware type, configured to control actuators of the set of actuators as per a first tolerance level and two computers from a second hardware type, different from the first hardware type, configured to control actuators of the set of actuators as per a second tolerance level, less stringent than the first tolerance level.

14 Claims, 5 Drawing Sheets

(56) References Cited

U.S. PATENT DOCUMENTS

| | | | |
|---|---|---|---|
| 2012/0101663 A1* | 4/2012 | Fervel | G05B 9/03 |
| | | | 701/3 |
| 2012/0277933 A1* | 11/2012 | Krogh | G05D 1/0061 |
| | | | 701/11 |
| 2015/0274293 A1* | 10/2015 | Heusinger | B64C 39/024 |
| | | | 701/36 |
| 2016/0200421 A1* | 7/2016 | Morrison | B64C 13/18 |
| | | | 244/17.23 |
| 2017/0081019 A1* | 3/2017 | Lin | G05D 1/0077 |
| 2019/0032573 A1 | 1/2019 | Priat et al. | |
| 2019/0163179 A1* | 5/2019 | Vieux | G05B 9/03 |
| 2019/0227548 A1* | 7/2019 | Lassini | G08G 5/0069 |

\* cited by examiner

FLIGHT CONTROL SYSTEM FOR AN AIRCRAFT

CROSS-REFERENCES TO RELATED APPLICATIONS

This application claims the benefit of the French patent application No. 1871824 filed on Nov. 26, 2018, the entire disclosures of which are incorporated herein by way of reference.

FIELD OF THE INVENTION

The invention relates to a flight control system for an aircraft designed to particularly control the rudders of the aircraft.

BACKGROUND OF THE INVENTION

Modern aircraft, in particular transport airplanes, comprise a set of flight control computers that compute orders for controlling actuators of rudders of the aircraft. These rudders are, for example, flaps or ailerons located on the wings of the aircraft, elevators located, for example, on a stabilator at the rear of the aircraft, a rudder located on the fin, etc. The flight control computers are different and redundant so that the flight control system is reliable faced with failures that are likely to affect some computers. Furthermore, in general, some of the computers are used in control mode (COM) and the other computers are used in monitor mode (MON), with a computer in monitor mode monitoring the operation of a computer in control mode. The computers are thus distributed in COM/MON pairs. In addition to flight control computers, the aircraft also comprises computers dedicated to controlling the slats and flaps, for example, of the SFCC ("Slat Flap Control Computer") type, computers for controlling the braking and ground-based steering of the aircraft, for example, of the BSCS ("Braking and Steering Control System") type and computers implementing a function for high-level control of the propulsion engines of the aircraft, for example, of the EIF ("Engine Interface Function") type, with this function being interfaced with controllers associated with the propulsion engines, for example, of the EEC ("Electronic Engine Controller") type or of the FADEC ("Full Authority Digital Engine Controller") type.

Document FR 2943036 discloses a flight control system according to the prior art. This flight control system comprises a set of primary computers, a set of secondary computers and a backup computer. Each of the primary and secondary computers corresponds to a COM/MON pair. Inside a COM/MON pair, when the MON module detects a failure in the COM module, the MON module deactivates the computer corresponding to this COM/MON pair and another primary or secondary computer is activated in its place. Thus, in the absence of a failure, the rudder actuators are controlled by primary computers. In the event of the failure of the primary computers, the rudder actuators are controlled by secondary computers. In the event of the failure of all the secondary computers, the rudder actuators are controlled by the backup computer according to very basic laws for the sake of reliability. The backup computer is generally only used for the time required to reset the primary and secondary computers. The primary computers allow the aircraft to be controlled both in manual mode, from flight components (stick, pedal, etc.) located in the cockpit, and in auto-pilot mode. In order to offer better availability than the primary computers, the secondary computers correspond to a control mode that is more reliable than the nominal mode of the primary computers. To this end, the secondary computers implement laws for controlling rudders that are simplified compared to the laws of the primary computers. As a result, the auto-pilot laws, due to their complexity, cannot be implemented in the secondary computers. The secondary computers therefore only allow the aircraft to be controlled in manual mode. However, on the new generations of aircraft, it is desirable that the availability of the auto-pilot mode is improved. Furthermore, for autonomous airplane or drone type aircraft, the probability of the loss of availability of the auto-pilot laws needs to be extremely low, for example, below $1 \times 10^{-9}$ per flight hour. Therefore, a requirement exists for a flight control system that allows this problem to be addressed without increasing the number of computers of the flight control system, so as to avoid increasing the complexity of this system and adversely affecting the mass of the aircraft.

SUMMARY OF THE INVENTION

A particular aim of the present invention is to provide a solution to this requirement. It relates to a flight control system for an aircraft comprising a set of actuators for controlling the aircraft and a set of flight control computers designed to control the actuators of the set of actuators.

The flight control system is characterized in that the set of flight control computers is only made up of a set of computers, called main computers, and of at least one backup computer, and in that:
- each of the main computers is of the duplex type, comprising two modules respectively acting in control mode (COM) and in monitor mode (MON);
- all the main computers are configured to implement auto-pilot laws for the aircraft;
- the set of main computers comprises two computers from a first hardware type, the computers being configured to control actuators of the set of actuators as per a first tolerance level; and
- the set of main computers comprises two computers from a second hardware type, different from the first hardware type, the computers being configured to control actuators of the set of actuators as per a second tolerance level, less stringent than the first tolerance level.

Thus, by virtue of this flight control system, given that all the main computers are configured to implement auto-pilot laws, the auto-pilot mode is continuously available during the normal operation of the aircraft. The aircraft pilot is thus relieved of the responsibility of monitoring the operation of the auto-pilot. Using main computers from two hardware types avoids a failure mode common to all of the main computers. The fact that the main computers of the first hardware type are configured to control the actuators as per a first tolerance level and that the main computers of the second hardware type are configured to control the actuators as per a second tolerance level, less stringent than the first tolerance level, allows the actuators to be controlled by the main computers of the first hardware type with a high level of precision when these main computers of the first hardware type are operational. In the event of the failure of the main computers of the first hardware type, the main computers of the second hardware type allow the actuators to be controlled with a lower precision level, due to the less stringent tolerance level. In return, this less stringent tolerance level improves the availability of the main computers of the second hardware type. This improvement in the operational availability of the main computers helps to implement auto-pilot laws in all the main computers, while using a limited number of computers. In the main computers of the second hardware type, the risk of failure due to the complexity of the auto-pilot laws is reduced by the use of a less stringent tolerance level than the first tolerance level used in the main computers of the first hardware type.

For a main computer, the aforementioned notion of a tolerance level corresponds to an authorized difference between, on the one hand, orders determined by the module acting in control mode (COM) and, on the other hand, corresponding orders determined by the module acting in monitor mode (MON). As long as the difference between the orders respectively determined by the module acting in control mode and by the module acting in monitor mode is less than this authorized difference, the module acting in monitor mode (MON) does not detect any errors and the main computer remains operational. When this difference is greater than the authorized difference, the module acting in monitor mode (MON) detects a failure of the computer.

In an advantageous embodiment:
  each of the main computers comprises at least one first software partition and one second software partition, the first software partition comprising functions for automatically piloting the aircraft and the second software partition comprising functions for controlling actuators of the set of actuators; and
  for each of the main computers, the module (MON) acting in monitor mode is configured to monitor the module (COM) acting in control mode independently for each of the partitions, so as to allow the partitions to be deactivated independently of one another.

Thus, the auto-pilot laws and the functions for controlling actuators are isolated from one another in separate partitions. Given that the COM/MON type monitoring is conducted independently for each of the partitions, the various partitions of a main computer can be deactivated independently of one another. In particular, in the event of the detection of a failure of the partition relating to the piloting laws, only this partition is deactivated in the relevant main computer: this computer continues to be operational for the functions for controlling actuators and the auto-pilot laws are then implemented by another main computer. The partition relating to the auto-pilot laws, in which the failure occurred, can be reset independently of the one or of the other partition(s) of the relevant main computer, so as to be available once again, if necessary. Consequently, this advantageous embodiment also helps to allow the auto-pilot laws to be available in all the main computers, since, on the one hand, the auto-pilot laws are implemented by each of the main computers and, on the other hand, a failure in one of the main computers, which could result from the complexity of the auto-pilot laws, would have no effect on the execution of the functions for controlling the actuators.

According to particular embodiments, which can be considered independently or in combination:
  the various computers of the set of main computers correspond to modular computers;
  the set of actuators includes at least one of the following sub-sets of actuators:
  a sub-set of actuators for rudders for primary control of the flight of the aircraft;
  a sub-set of actuators comprising the actuators of the slats and/or flaps of the aircraft;
  a sub-set of actuators designed to control the braking and the ground-based steering of the aircraft;
  a sub-set of actuators corresponding to the propulsion engines of the aircraft.

Advantageously, each of the main computers comprises a separate software partition associated with each sub-set of actuators and the module acting in monitor mode is configured to monitor the module acting in control mode independently for each of the partitions, so as to allow the partitions to be deactivated independently of one another;
  a first one of the two computers of the first hardware type and a first one of the two computers of the second hardware type are powered by a first electrical power supply, and a second one of the two computers of the first hardware type and a second one of the two computers of the second hardware type are powered by a second electrical power supply independent of the first electrical power supply;
  a first one of the two computers of the first hardware type and a first one of the two computers of the second hardware type are configured to control a first sub-set of actuators of the set of actuators and a second one of the two computers of the first hardware type and a second one of the two computers of the second hardware type are configured to control a second sub-set of actuators of the set of actuators, separate from the first sub-set of actuators.

In particular, the actuators of the set of actuators are distributed between the first sub-set of actuators and the second sub-set of actuators in such a way that, for a rudder of the aircraft belonging to a sub-set of rudders referred to as critical rudders, a first actuator associated with this rudder forms part of the first sub-set of actuators and a second actuator associated with this rudder forms part of the second sub-set of actuators. Advantageously, the various actuators of the set of actuators are distributed between the first sub-set of actuators and the second sub-set of actuators in such a way that the actuators of the first sub-set of actuators alone allow the flight of the aircraft to be controlled and the actuators of the second sub-set of actuators alone allow the flight of the aircraft to be controlled;
  the flight control system further comprises:
  a set of actuator controllers; and
  two independent and different communication networks, and each actuator of the set of actuators is controlled by an actuator controller of the set of actuator controllers, each of the main computers is connected to each of the two communication networks and each of the actuator controllers is connected to each of the two communication networks. In particular, with each of the two communication networks comprising a set of communication equipment requiring an electrical power supply in order to operate, a first part of the communication equipment of each communication network is powered by a first electrical power supply and a second part of the communication equipment of each communication network is powered by a second electrical power supply independent of the first electrical power supply;
  the set of main computers only comprises the two computers of the first hardware type and the two computers of the second hardware type;
  for each computer of the set of main computers, the two modules respectively acting in control mode (COM) and in monitor mode (MON) are similar modules, both in terms of hardware and of software.

The invention also relates to an aircraft comprising a flight control system as previously described.

BRIEF DESCRIPTION OF THE DRAWINGS

The invention will be better understood upon reading the following description and with reference to the accompanying figures, in which.

DETAILED DESCRIPTION OF THE PREFERRED EMBODIMENTS

Figure 1:
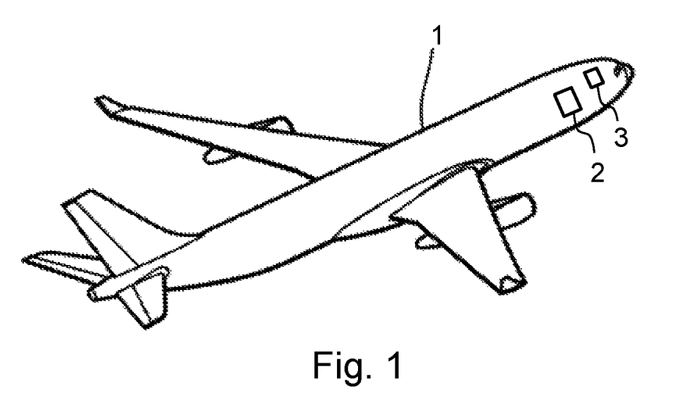
FIG. 1 shows an aircraft comprising a flight control system.
Figure 2:
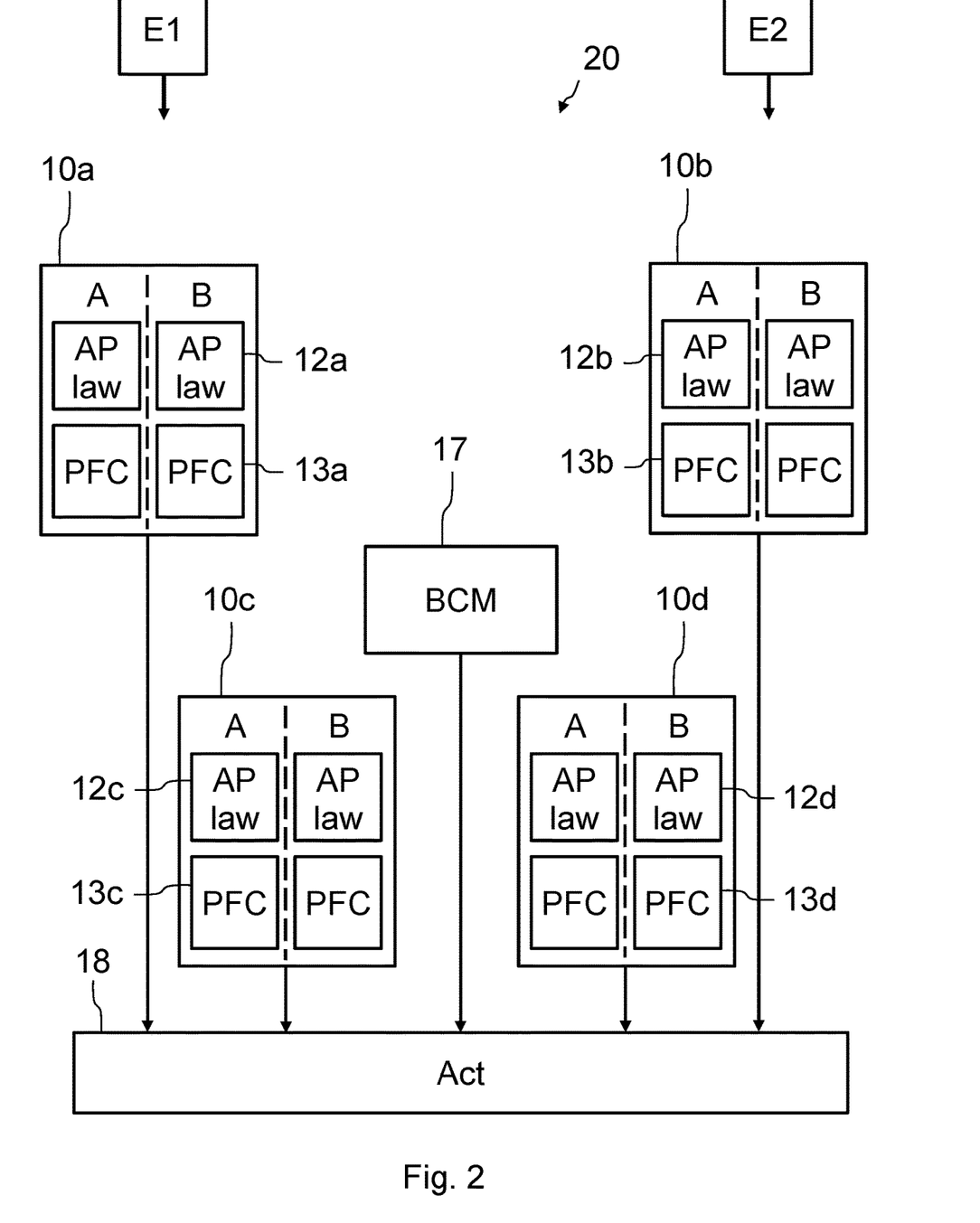
FIG. 2 schematically shows a flight control system according to one embodiment of the invention.

The aircraft 1 shown in FIG. 1 comprises a flight control system, such as the flight control system 20 shown in FIG. 2. This flight control system comprises a set of flight control computers and a set 18 of actuators for controlling the aircraft, denoted Act in the figure. The set of flight control computers is only made up of a set of computers, called main computers 10a, 10b, 10c, 10d, and of at least one backup computer 17 (denoted BCM (Backup Control Module) in the figure). These computers are located, for example, in an avionics bay 2 of the aircraft, near the cockpit 3. Each of the main computers is of the duplex type, i.e., it comprises two similar modules, denoted channel A and channel B in the figure. Each function implemented by the main computer is duplicated on each of the channels A and B, with one of the channels acting in control mode (COM) and the other acting in monitor mode (MON). This allows monitoring of the COM/MON type to be conducted, during which monitoring, for each function implemented by the main computer, the channel acting in monitor mode monitors the channel acting in control mode in order to detect a possible failure of the pair of channels A and B. According to a first alternative, for all the functions implemented by the main computer, channel A acts in COM mode and channel B acts in MON mode. According to a second alternative, for all the functions implemented by the main computer, channel B acts in COM mode and channel A acts in MON mode. According to a third alternative, for a first part of the functions implemented by the main computer, channel A acts in COM mode and channel B acts in MON mode and, for a second part (in addition to the first part) of the functions implemented by the main computer, channel B acts in COM mode and channel A acts in MON mode, which allows the load of the processors of channels A and B to be better distributed. All the main computers are configured to implement auto-pilot laws for the aircraft, denoted APlaw in the figure. The set of main computers comprises two computers 10a, 10b from a first hardware type. These computers of the first hardware type are configured to control actuators of the set 18 of actuators as per a first tolerance level. The set of main computers also comprises two computers 10c, 10d from a second hardware type, different from the first hardware type. These computers of the second hardware type are configured to control actuators of the set 18 of actuators as per a second tolerance level, less stringent than the first tolerance level. For a main computer, the tolerance level corresponds to an authorized difference between, on the one hand, orders determined by the COM module acting in control mode (for example, channel A) and, on the other hand, corresponding orders determined by the MON module acting in monitor mode (for example, channel B). The considered orders equally can be orders for controlling actuators and orders corresponding to intermediate computations, for example, outputs of the control laws. The authorized difference can be different depending on the considered orders: thus, for example, the authorized differences can be different for a rudder of the aircraft and for an aileron of the aircraft. The authorized difference also can be different for a control law output, for example, a control law that computes a desired angle of attack for the aircraft. The fact that the second tolerance level is less stringent than the first tolerance level means that, for a given order, the difference authorized for this order in the computers 10c, 10d of the second type is greater than the difference authorized for this order in the computers 10a, 10b of the first type. In a computer, when the difference between an order determined by the COM module and a corresponding order determined by the MON module is greater than the difference authorized for this order, the COM/MON monitoring detects a failure of the computer.

Given that the main computers of the first hardware type are configured to control the actuators as per a first tolerance level and that the main computers of the second hardware type are configured to control the actuators as per a second tolerance level less stringent than the first tolerance level, in a nominal manner the actuators are controlled by the main computers of the first hardware type with a high level of precision when these main computers of the first hardware type are operational. This allows very rapid detection of an erroneous order. In the event of the failure of the main computers of the first hardware type (for example, due to the authorized error threshold being exceeded, which resulted in triggering of the COM/MON monitoring), the main computers of the second hardware type allow the actuators to be controlled with a lower level of precision, due to the less stringent tolerance level. In return, this less stringent tolerance level allows the availability of the main computers of the second hardware type, and therefore the reliability of the control, to be improved, since in the main computers of the second hardware type, the risk of failure due to the complexity of the auto-pilot laws is reduced by the use of a less stringent tolerance level than the first tolerance level used in the main computers of the first hardware type.

For each of the main computers, the synchronization of channels A and B conducting the COM/MON type monitoring is preferably conducted with a synchronization time that is below a predetermined duration, for example, 1 ms. This results in rapid synchronization that helps to allow the auto-pilot laws to be reliably implemented in all the main computers. Indeed, the speed of the synchronization allows unintentional triggering of the COM/MON monitoring to be avoided, hence greater reliability of the monitoring. This also allows faster detection in the event of divergence between channels A and B (corresponding to a failure) for implementing a function of the main computer.

In order to control the actuators, each of the main computers is conventionally connected to a set of sensors of the aircraft. These sensors provide measurements of parameters of the aircraft (speed, altitude, temperature, etc.), the position of the actuators and/or of rudders controlled by these actuators. These measurements are used in control laws implemented by the main computers to control the actuators.

In an advantageous embodiment, each of the main computers 10a, 10b, 10c, 10d comprises at least one first software partition and one second software partition for each of the channels A and B used for the COM/MON monitoring. The first partition 12a, 12b, 12c, 12d comprises functions for automatically piloting the aircraft that are designed to implement the auto-pilot laws of the aircraft, denoted APlaw in the figure. The second partition 13a, 13b, 13c, 13d comprises functions for controlling actuators of the set 18 of actuators. These actuators are, for example, actuators of at least one part of the rudders for primary control of the flight of the aircraft (denoted PFC "Primary Flight Control," in the figure). The term rudders for primary control of the flight of the aircraft in this case denotes aircraft rudders that are essential for controlling flight, in particular the fin, the elevators, the stabilator, the ailerons and the spoilers. Advantageously, the first partition 12a, 12b, 12c, 12d also comprises laws for manually piloting the aircraft. For each of the main computers 10a, 10b, 10c, 10d, the COM/MON monitoring is conducted independently for each of the partitions, respectively 12a and 13a, 12b and 13b, 12c and 13c, 12d and 13d, in order to allow deactivation of the partitions of the main computer independently of one another. Both the auto-pilot laws and the functions for controlling actuators correspond to critical functions of the aircraft, for which the required quality assurance level is of the DAL-A type, corresponding to the highest quality assurance level. The use of partitions for implementing these functions having a DAL-A quality assurance level is innovative, especially since the functions for controlling actuators use fast control loops (of approximately 1 ms, for example), during which information originating from sensors is acquired with short latency times and with a high level of acquisition precision for the values measured by these sensors. To this end, each main computer 10a, 10b, 10c, 10d implementing these partitions is designed to guarantee the determinism of the execution times of the software used in the partitions.

The use of partitions helps to allow auto-pilot laws to be implemented in all the main computers 10a, 10b, 10c, 10d. Indeed, due to the complexity of the auto-pilot laws, the probability of detecting, by the COM/MON monitoring, a failure of the partition 12a, 12b, 12c, 12d corresponding to these laws is higher than the probability of detecting a failure of the partition 13a, 13b, 13c, 13d comprising functions for controlling actuators. With the monitoring and the deactivation being conducted independently for the various partitions, respectively 12a and 13a, 12b and 13b, 12c and 13c, 12d and 13d, a failure detected in a partition of a main computer only leads to the deactivation of the partition and has no effect on the other partition(s) of the main computer. For example, when auto-pilot laws for the aircraft are implemented by the partition 12a of channel A of the main computer 10a acting in control mode (COM), the implementation of the piloting laws in the partition 12a of channel A is monitored by the corresponding partition 12a of channel B of the primary computer 10a acting in monitoring mode (MON). If a failure is detected, the COM/MON monitoring only deactivates the partition 12a of the computer 10a and the auto-pilot laws are then implemented by one of the partitions 12b, 12c, 12d of the other main computers 10b, 10c, 10d, which then become active. Preferably, the partition 12a is then reset (independently of the other partition(s) 13a of the main computer 10a) so as to be available once again, if necessary. This deactivation of the partition 12a does not affect the partition 13a of the main computer 10a, which can remain active if it was active during the failure that occurred in the partition 12a. Reciprocally, a failure in the partition 13a does not affect the partition 12a.

Controlling the actuators using the functions for controlling actuators of the second partitions 13a, 13b, 13c, 13d of the main computers 10a, 10b, 10c, 10d is conducted as per the first tolerance level in the partitions 13a and 13b of the computers 10a and 10b of the first hardware type and as per the second tolerance level, which is less stringent than the first tolerance level, in the partitions 13c and 13d of the computers 10c and 10d of the second hardware type.

In a particular embodiment, a first primary computer 10a of the first hardware type and a first primary computer 10c of the second hardware type are powered by a first electrical power supply E1, and a second primary computer 10b of the first hardware type and a second primary computer 10d of the second hardware type are powered by a second electrical power supply E2, as shown in FIG. 2. Thus, in the event of the failure of one of the electrical power supplies E1 and E2, at least one primary computer of the first hardware type (10a or 10b) and at least one primary computer of the second hardware type (10c or 10d) remain electrically powered and thus can control the actuators that are connected thereto. The two electrical power supplies E1 and E2 are, for example, generators each driven by a different propulsion engine of the aircraft. Thus, in the event of the failure of an engine, at least one of the power supplies E1 and E2 remains operational. The backup computer 17 is preferably powered by an electrical power supply independent of E1 and E2, for example, an electrical power supply backed up by a battery.

The flight control computers typically have a failure rate of the order of $1 \times 10^{-4}$ to $1 \times 10^{-5}$ per flight hour. The current regulations stipulate that a flight control system allows the aircraft to be controlled with a catastrophic failure probability of less than $1 \times 10^{-9}$ per flight hour. The use of three redundant flight control computers therefore allows compliance with these regulations. Consequently, the flight control system 20 according to the invention, which comprises four main redundant computers, allows compliance with the current regulations. It even allows the aircraft to take off with a failed main computer (which departure is referred to as MEL "Minimum Equipment List") since three main computers then remain operational. The flight control system 20 thus allows compliance with both the current regulations and the operational requirements of airlines, with a minimum number of main computers, while guaranteeing the continuous availability of the auto-pilot laws.

In a particular embodiment, the main computers 10a, 10b, 10c, 10d correspond to modular computers. This facilitates the upgradability of the flight control system by allowing, for example, a processor card of a computer to be replaced with another card comprising a more recent and more powerful processor, memory to be easily added to the computer or the number of input/output cards to be modulated to manage a greater or lesser number of actuators or of rudders depending on the type of aircraft.

In one embodiment of the invention, the set 18 of actuators includes at least one of the following sub-sets of actuators:
- a sub-set of actuators for rudders for primary control of the flight of the aircraft;
- a sub-set of actuators comprising the actuators of the slats and/or flaps of the aircraft;
- a sub-set of actuators designed to control the braking and the ground-based steering of the aircraft;
- a sub-set of actuators corresponding to the propulsion engines of the aircraft.

Each main computer 10a, 10b, 10c, 10d is then designed to control all these sub-sets of actuators of the set 18 of actuators. The main computer 10 shown in FIG. 3 corresponds to any one of the main computers 10a, 10b, 10c, 10d. Each channel A 10com and channel B 10mon comprises a first partition 12 comprising the auto-pilot functions of the aircraft that are designed to implement the auto-pilot laws of the aircraft and a second partition 13 comprising functions for controlling actuators, as previously stated. Advantageously, the first partition 12 also comprises laws for manually piloting the aircraft.

Figure 3:
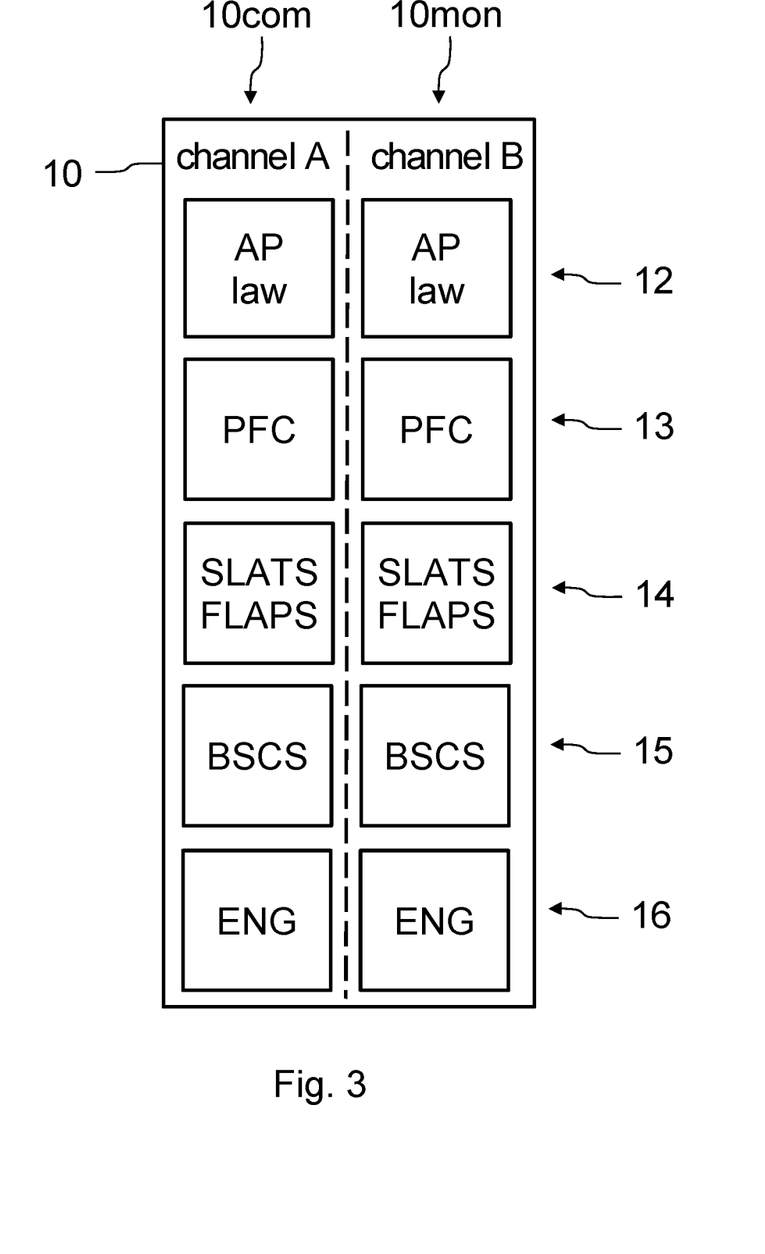
FIG. 3 schematically shows a main computer of a flight control system according to one embodiment of the invention.

According to a first alternative, controlling the actuators of the various sub-sets of actuators is implemented in the second partition 13.

According to a second alternative shown in FIG. 3, the main computer 10 comprises a partition associated with each sub-set of actuators. The second partition 13, denoted PFC in the figure, is associated with the sub-set of actuators of rudders for primary control of the flight of the aircraft. A third partition 14 is associated with the actuators for the slats and/or flaps. A fourth partition 15, denoted BSCS ("Braking and Steering Control System") in the figure, is associated with the sub-set of actuators designed to control the braking and the ground-based steering of the aircraft. A fifth partition 16, denoted ENG in the figure, is associated with the sub-set of actuators corresponding to the propulsion engines of the aircraft. The channel of the channels A and B acting in monitor mode is configured to monitor the other one of the channels A and B acting in control mode, independently for each of the partitions 12, 13, 14, 15 and 16. This allows monitoring of a possible failure in a partition and deactivation of this partition independently of the other partitions, as already explained for the first partition 12 and the second partition 13.

Advantageously, the set 18 of actuators comprises all the aforementioned sub-sets of actuators. The flight control system 20 then allows all the flight related and ground-based steering related functions of the aircraft to be controlled, while guaranteeing the continuous availability of the auto-pilot laws. Thus, all the four main computers allow replacement of not only the primary and secondary computers of a flight control system according to the prior art, but also of the computers dedicated to controlling slats and flaps (for example, of the SFCC type), the computers for controlling braking and ground-based steering (for example, of the BSCS type) and the function for high-level control of the propulsion engines (for example, of the EIF type). This allows considerable mass and space-saving to be provided, while also allowing continuous availability of the auto-pilot laws.

Furthermore, the fact that the main computers integrate the control of all the flight related and ground-based steering related functions of the aircraft allows information exchanges between the auto-pilot laws, which are implemented in the first partition 12, and the functions for controlling the actuators, which are implemented in the second to fifth partitions 13 to 16, to be simplified. These information exchanges are thus conducted inside the flight control system 20, without requiring communication with computers outside this flight control system, such as the SFCC, BSCS computers or a computer implementing the EIF function of the prior art. This also allows integration of the various control laws (both for automatic and manual piloting) in a centralized manner in the main computers 10a, 10b, 10c, 10d, without having to decentralize parts of some control laws to other computers, such as the SFCC, BSCS computers or a computer implementing the EIF function of the prior art. This enables unique validation of these control laws in the main computers. This also avoids having to duplicate parts of the laws in different computers, which are sometimes manufactured by several different manufacturers, and having to synchronize the execution of the control laws in these various computers. This thus results in a simplification of the flight control system and its design. The centralized management of the piloting laws in the main computers also allows the overall control of the aircraft to be optimized, while particularly providing better performance levels for the aircraft (better steering precision, better reconfiguration in the event of a failure, etc.).

Figure 4:
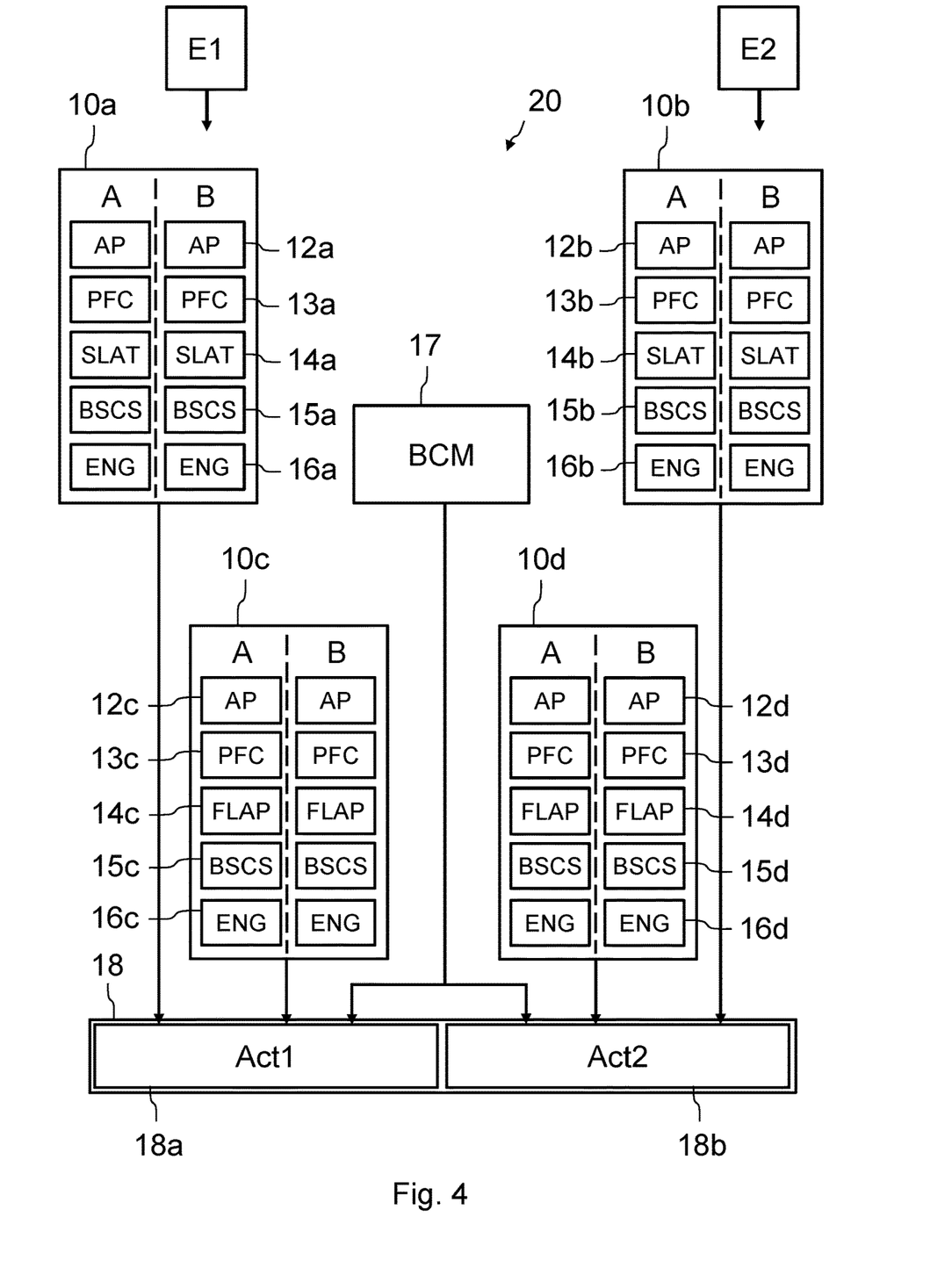
FIG. 4 shows a first variant of a flight control system according to one embodiment of the invention.

In a first alternative embodiment of the invention, as shown in FIG. 4, a first 10a one of the two computers of the first hardware type and a first 10c one of the two computers of the second hardware type are configured to control a first sub-set 18a of actuators of the set of actuators and a second 10b one of the two computers of the first hardware type and a second 10d one of the two computers of the second hardware type are configured to control a second sub-set 18b of actuators of the set of actuators, separate from the first sub-set of actuators. In nominal operation, the flight control system 20 is configured in such a way that the first computer 10a of the first hardware type controls the actuators of the first sub-set 18a of actuators and the second computer 10b of the first hardware type controls the actuators of the second sub-set 18b of actuators. The actuators are thus controlled as per the first tolerance level, which allows more precise control of the actuators. In the event of a failure detected by the COM/MON monitoring in a partition 13a, 14a, 15a, 16a responsible for controlling the actuators, this partition is deactivated and the corresponding partition 13c, 14c, 15c, 16c of the computer 10c is activated. The actuators controlled by functions implemented in this partition are then controlled as per the second tolerance level, which is less stringent than the first tolerance level: consequently, the control of the actuators is slightly less precise, but more reliable (for example, the risk of detecting a failure is lower in the event of a gust of wind on a rudder).

Advantageously, the actuators of the set 18 of actuators are distributed in the two sub-sets 18a and 18b of actuators in such a way that, for a rudder of the aircraft belonging to a sub-set of rudders, called critical rudders, a first actuator associated with this rudder forms part of the first sub-set 18a of actuators and a second actuator associated with this rudder forms part of the second sub-set 18b of actuators. Thus, even if only one of the four main computers is operational at a given instant, this main computer can control the actuators of one of the two sub-sets 18a, 18b of actuators and, consequently, at least one actuator of each critical rudder of the aircraft, so as to allow each critical rudder to be controlled. The term critical rudder in this case denotes a rudder of the aircraft that is essential for the primary control of the flight of the aircraft, in particular the fin, the ailerons, the elevator and the slats located at the front of the wings. The term critical rudder also includes the brakes and the control for orienting the nose wheel (for ground-based control), as well as the propulsion engines.

More advantageously, the actuators of the set 18 of actuators are distributed in the two sub-sets 18a and 18b of actuators in such a way that the actuators of the first sub-set 18a of actuators alone allow flight and ground-based control of the aircraft and the actuators of the second sub-set 18b of actuators alone allow flight and ground-based control of the aircraft. In particular, the actuators of each set of actuators allow sufficient control of the aircraft along its longitudinal axis, its roll axis and its yaw axis. For example, each of the sub-sets 18a and 18b of actuators comprises two ailerons, two elevators, a slat, a stabilator, two pairs of spoilers, a fin actuator, brake actuators and a control for the propulsion engines. Thus, even if only one of the four main computers is operational at a given instant, this main computer can control the actuators of one of the two sub-sets 18*a*, 18*b* of actuators, which allows sufficient control of the aircraft to allow it to fly and to be controlled on the ground.

More advantageously, the first computer 10*a* of the first hardware type, the first computer 10*c* of the second hardware type, and those of the actuators of the first sub-set 18*a* of actuators that require an electrical power supply, are powered by the first electrical power supply E1. The second computer 10*b* of the first hardware type, the second computer 10*d* of the second hardware type, and those of the actuators of the second sub-set 18*b* of actuators that require an electrical power supply, are powered by the second electrical power supply E2. Thus, in the event of the failure of one of the electrical power supplies E1 and E2, a computer of the first hardware type, a computer of the second hardware type and the sub-set of actuators controlled by these two computers are electrically powered and consequently allow the flight and the ground-based control of the aircraft. Even if the aircraft has taken off with a failed main computer, at least one main computer remains operational to control the sub-set of actuators.

This first alternative embodiment of the invention is particularly adapted to a flight control system 20, in which the actuators are all or partly analogically connected to the main flight control computers. However, it is not exclusive to such an embodiment and also can be applied in the case of actuators digitally connected (for example, via data communication links or by a communication network) to the main flight control computers.

Figure 5:
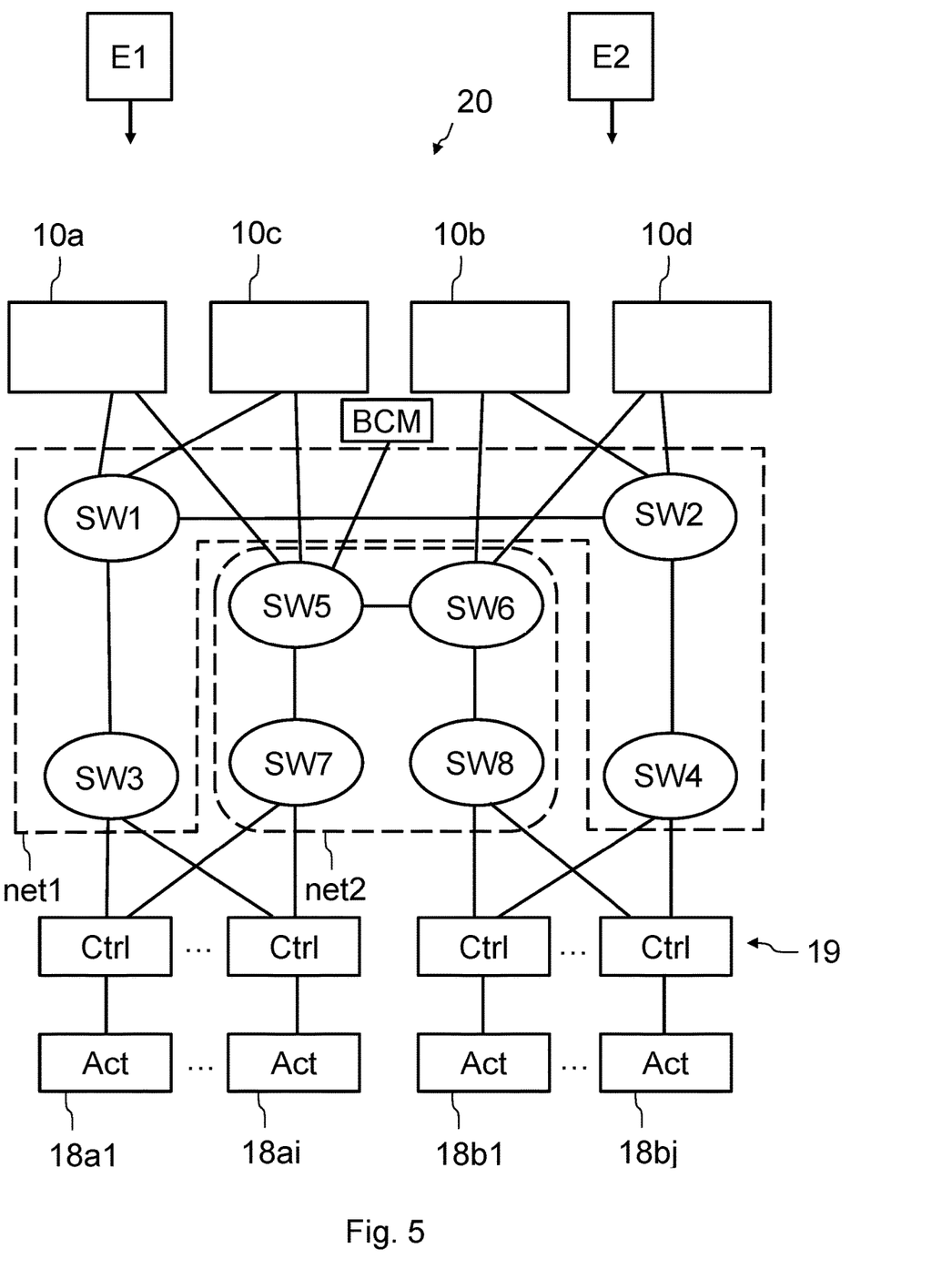
FIG. 5 shows a second variant of a flight control system according to one embodiment of the invention.

In a second alternative embodiment of the invention, as shown in FIG. 5, the flight control system 20 comprises a set 19 of actuator controllers and two independent and different communication networks net1, net2. Each of the main computers 10*a*, 10*b*, 10*c*, 10*d* is connected to each of the two communication networks net1, net2 and each of the actuator controllers 19 is connected to each of the two communication networks. The set 19 of actuator controllers is designed to control the various actuators 18*a*1 . . . 18*a*1, 18*b*1 . . . 18*bj* of the flight control system 20. Each actuator controller can control one or more actuators. The actuator controllers of the set of actuator controllers are of two different types to guarantee the reliability of the flight control system 20. The two communication networks net1, net2 are, for example, switched deterministic Ethernet type networks, compliant with standard ARINC 664 part 7. In order to guarantee their dissimilarity, these two communication networks use equipment (such as switches SW1 . . . SW8) from different types of hardware and software. The switches SW1 . . . SW4 of the first communication network net are of a first hardware type and of a first software type, whereas the switches SW5 . . . SW8 of the second communication network net2 are of a second hardware type and of a second software type. Thus, a mode failure common to the two communication networks cannot exist. Consequently, in the event of the failure of a communication network, each of the main computers 10*a*, 10*b*, 10*c*, 10*d* can communicate with each of the actuator controllers 19 through the other communication network, since each of the main computers is connected to each of the communication networks and each of the actuator controllers is also connected to each of the communication networks.

In this second variant, each of the main computers 10*a*, 10*b*, 10*c*, 10*d* can communicate with each of the actuator controllers 19 and consequently can control each of the actuators 18*a*1 . . . 18*a*1, 18*b*1 . . . 18*bj* of the set 18 of actuators. Thus, in the event of the reconfiguration of the flight control system 20 following failures in the main computers or failures in partitions of the main computers, any one of the main computers can control all the actuators of the set 18 of actuators.

Advantageously, the first main computer 10*a* of the first hardware type, the first main computer 10*c* of the second hardware type, a first sub-set of equipment SW1, SW3 of the first communication network net1 and a first sub-set of equipment SW5, SW7 of the second communication network net2, to which these two main computers 10*a* and 10*c* are connected, are powered by the first electrical power supply E1. Those that require an electrical power supply from among the actuators of a first sub-set of actuators 18*a*1 . . . 18*a*1 connected to the first sub-set of equipment SW1, SW3 of the first communication network net1 and to the first sub-set of equipment SW5, SW7 of the second communication network net2 are also powered by the first electrical power supply E1, as are the corresponding actuator controllers 19. Similarly, the second main computer 10*b* of the first hardware type, the second main computer 10*d* of the second hardware type, a second sub-set of equipment SW2, SW4 of the first communication network net1 and a second sub-set of equipment SW6, SW8 of the second communication network net2, to which these two main computers 10*b* and 10*d* are connected, are powered by the second electrical power supply E2. Those that require an electrical power supply from among the actuators of a second sub-set of actuators 18*b*1 . . . 18*bj* connected to the second sub-set of equipment SW2, SW4 of the first communication network net1 and to the second sub-set of equipment SW6, SW8 of the second communication network net2 are also powered by the second electrical power supply E2, along with the corresponding actuator controllers 19. Thus, in the event of the failure of the electrical power supply E1, the main computer 10*b* of the first hardware type and the main computer 10*d* of the second hardware type can communicate with the controllers of the actuators of the second sub-set of actuators 18*b*1 . . . 18*bj* so as to control these actuators. Similarly, in the event of the failure of the electrical power supply E2, the main computer 10*a* of the first hardware type and the main computer 10*c* of the second hardware type can communicate with the controllers of the actuators of the first sub-set of actuators 18*a*1 . . . 18*a*1 so as to control these actuators. Consequently, to the extent that the actuators 18 are distributed between the two sub-sets of actuators, as previously shown, in the event of a failure of an electrical power supply E1 or E2, the flight control system 20 can continue to control the aircraft in flight and on the ground.

Throughout all the embodiments, the backup computer 17 is designed to implement reliable control of the aircraft, according to simplified control laws, in the event of the failure of all the main computers, for the time required to reset the main computers. This backup computer 17 is similar to the backup computers of the prior art. Following resetting of the main computers, those among them that are operational can resume their function of controlling the flight of the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight control system for an aircraft, comprising:
a set of actuators for controlling the aircraft, and
a set of flight control computers configured to control actuators of the set of actuators, wherein:
the set of flight control computers is made up of computers selected from a group consisting of: a set of main computers, and at least one backup computer,
each main computer is of a duplex type, comprising two modules respectively acting in control mode and in monitor mode;
all of the main computers are configured to implement auto-pilot laws for the aircraft;
the set of main computers comprises two first computers, said two first computers being configured to control actuators of the set of actuators as per a first tolerance level; and
the set of main computers comprises two additional computers, said two additional computers being configured to control actuators of the set of actuators as per a second tolerance level, less stringent than the first tolerance level,
wherein, for each of the main computers, the first and second tolerance levels correspond to an authorized difference between orders determined by the module acting in control mode and corresponding orders determined by the module acting in monitor mode.

2. The system according to claim 1, wherein:
each of the main computers comprises at least one first software partition and one second software partition, the first software partition comprising functions for automatically piloting the aircraft and the second software partition comprising functions for controlling the actuators of the set of actuators; and
for each of the main computers, the module acting in monitor mode is configured to monitor the module acting in control mode independently for each of the first and second partitions, so as to allow the first and second partitions to be deactivated independently of one another.

3. The system according to claim 1, wherein the computers of the set of main computers comprise modular computers.

4. The system according to claim 1, wherein the set of actuators includes at least one of the following sub-sets of actuators:
a sub-set of actuators for rudders for primary control of a flight of the aircraft;
a sub-set of actuators comprising the actuators of at least one of slats or flaps of the aircraft;
a sub-set of actuators designed to control a braking and a ground-based steering of the aircraft; or
a sub-set of actuators corresponding to propulsion engines of the aircraft.

5. The system according to claim 4, wherein each of the main computers comprises a separate software partition associated with each sub-set of actuators and the module acting in monitor mode is configured to monitor the module acting in control mode independently for each of the partitions, so as to allow the partitions to be deactivated independently of one another.

6. The system according to claim 1, wherein a first one of the two first computers and a first one of the two additional computers are powered by a first electrical power supply, and a second one of the two first computers and a second one of the two additional computers are powered by a second electrical power supply independent of the first electrical power supply.

7. The system according to claim 1, wherein a first one of the two first computers and a first one of the two additional computers are configured to control a first sub-set of actuators of the set of actuators and a second one of the two first computers and a second one of the two additional computers are configured to control a second sub-set of actuators of the set of actuators, separate from the first sub-set of actuators.

8. The system according to claim 7, wherein the actuators of the set of actuators are distributed between the first sub-set of actuators and the second sub-set of actuators in such a way that, for a rudder of the aircraft belonging to a sub-set of rudders referred to as critical rudders, a first actuator associated with this rudder forms part of the first sub-set of actuators and a second actuator associated with this rudder forms part of the second sub-set of actuators.

9. The system according to claim 7, wherein the actuators of the set of actuators are distributed between the first sub-set of actuators and the second sub-set of actuators such that the actuators of the first sub-set of actuators alone allow a flight of the aircraft to be controlled and the actuators of the second sub-set of actuators alone allow the flight of the aircraft to be controlled.

10. The system according to any claim 1, further comprising:
a set of actuator controllers; and
two independent and different communication networks, wherein
each actuator of the set of actuators is controlled by an actuator controller of the set of actuator controllers,
each of the main computers is connected to each of the two communication networks, and
each of the actuator controllers is connected to each of the two communication networks.

11. The system according to claim 10, wherein, with each of the two communication networks comprising a set of communication equipment requiring an electrical power supply in order to operate, a first part of the communication equipment of each communication network is powered by a first electrical power supply and a second part of the communication equipment of each communication network is powered by a second electrical power supply independent of the first electrical power supply.

12. The system according to claim 1, wherein the set of main computers only comprises said two first computers and said two additional computers of the second hardware type.

13. The system according to claim 1, wherein, for each computer of the set of main computers, the two modules respectively acting in control mode and in monitor mode are similar modules, both in terms of hardware and of software.

14. An aircraft comprising a flight control system according to claim 1.

* * * * *